US006646695B1

(12) United States Patent
Gauselmann

(10) Patent No.: US 6,646,695 B1
(45) Date of Patent: Nov. 11, 2003

(54) APPARATUS FOR POSITIONING A SYMBOL DISPLAY DEVICE ONTO A DOOR ELEMENT OF A CASING OF A COIN OPERATED ENTERTAINMENT AUTOMAT

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 295 days.

(21) Appl. No.: 09/625,734

(22) Filed: Jul. 26, 2000

(30) Foreign Application Priority Data

Aug. 5, 1999 (DE) ........................................ 199 36 498

(51) Int. Cl.[7] .......................... A63F 13/00; A63F 5/04; G02F 1/1333

(52) U.S. Cl. ............................ 349/58; 345/31; 463/31; 463/46

(58) Field of Search ............................ 349/58; 345/31; 463/20, 31, 46

(56) References Cited

U.S. PATENT DOCUMENTS 5,127,651 A * 7/1992 Okada .................... 273/143 R
5,537,290 A * 7/1996 Brown et al. ............... 361/681
5,603,659 A * 2/1997 Okada ......................... 463/25
5,765,797 A * 6/1998 Greene et al. .............. 248/398
6,134,103 A * 10/2000 Ghanma ..................... 361/681
6,315,666 B1 * 11/2001 Mastera et al. ............... 463/31

FOREIGN PATENT DOCUMENTS

| | | |
|---|---|---|
| DE | 4211311 | 4/1992 |
| DE | 4339022 | 11/1993 |

* cited by examiner

*Primary Examiner*—Toan Ton
*Assistant Examiner*—Andrew Schechter
(74) *Attorney, Agent, or Firm*—Horst M. Kasper

(57) ABSTRACT

An apparatus for positioning of a symbol display device on the door element of a casing of a coin actuated entertainment automat. The symbol display device at the coin actuated entertainment automate wherein the symbol display device is furnished as a television monitor or as a roller shaped circulating body. The symbol display device exhibits conventionally a fixed position on the front side with the disadvantage that a stray light free observation of the symbol display device is not possible for each user of the coin actuated entertainment automat. This disadvantage is to be removed with the construction according to the present invention. The symbol display device is disposed vertically shiftable on the front side of the casing of a coin actuated entertainment automat for obtaining a reflection free view position of the symbol display device.

29 Claims, 3 Drawing Sheets

APPARATUS FOR POSITIONING A SYMBOL DISPLAY DEVICE ONTO A DOOR ELEMENT OF A CASING OF A COIN OPERATED ENTERTAINMENT AUTOMAT

BACKGROUND OF THE INVENTION

1. Field of the Invention

The invention relates to a device for the positioning of a symbol display device on a door element of a casing of a coin operated entertainment automat.

2. Brief Description of the Background of the Invention Including Prior Art

A coin operated entertainment automat illustrating winning symbols, wherein a television monitor is employed for the presentation of symbol combinations associated with winnings, is described in the German journal ‘Automaten Markt’, issue March 1996, p. 160. The coin operated entertainment automat is disposed on a medium-high pedestal for operation. Based on this situation, the angle of vision onto the symbol combination is not of equal quality for all users of the coin actuated entertainment automat. In particular larger, or, respectively, smaller persons have frequently problems in recognizing illustrated symbols based on stray light at the place of installation.

SUMMARY OF THE INVENTION

1. Purposes of the Invention

It is an object of the present invention to improve such entertainment automat in such a way that the initially recited problems are eliminated.

These and other objects and advantages of the present invention will become evident from the description which follows.

2. Brief Description of the Invention

The construction according to the present invention is associated with the advantage that now the player can find an ideal position for the symbol display device for this player, wherein the player slides the symbol display device within the offered vertical adjustment possibility. In order to be able to oppose also extrinsic light effects, the symbol display device is formed by two display devices disposed relative to each other around a horizontally running axis, wherein the two display devices are tiltable relative to each other around the horizontally running axis such that also present reflecting stray light can be substantially avoided. In addition, an operating keyboard furnishing the operating keys or push-button keys can be tilted in its installation angle depending on personal taste for increasing of the comfort.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

An embodiment according to the present invention is illustrated by way of the device illustrated in the drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
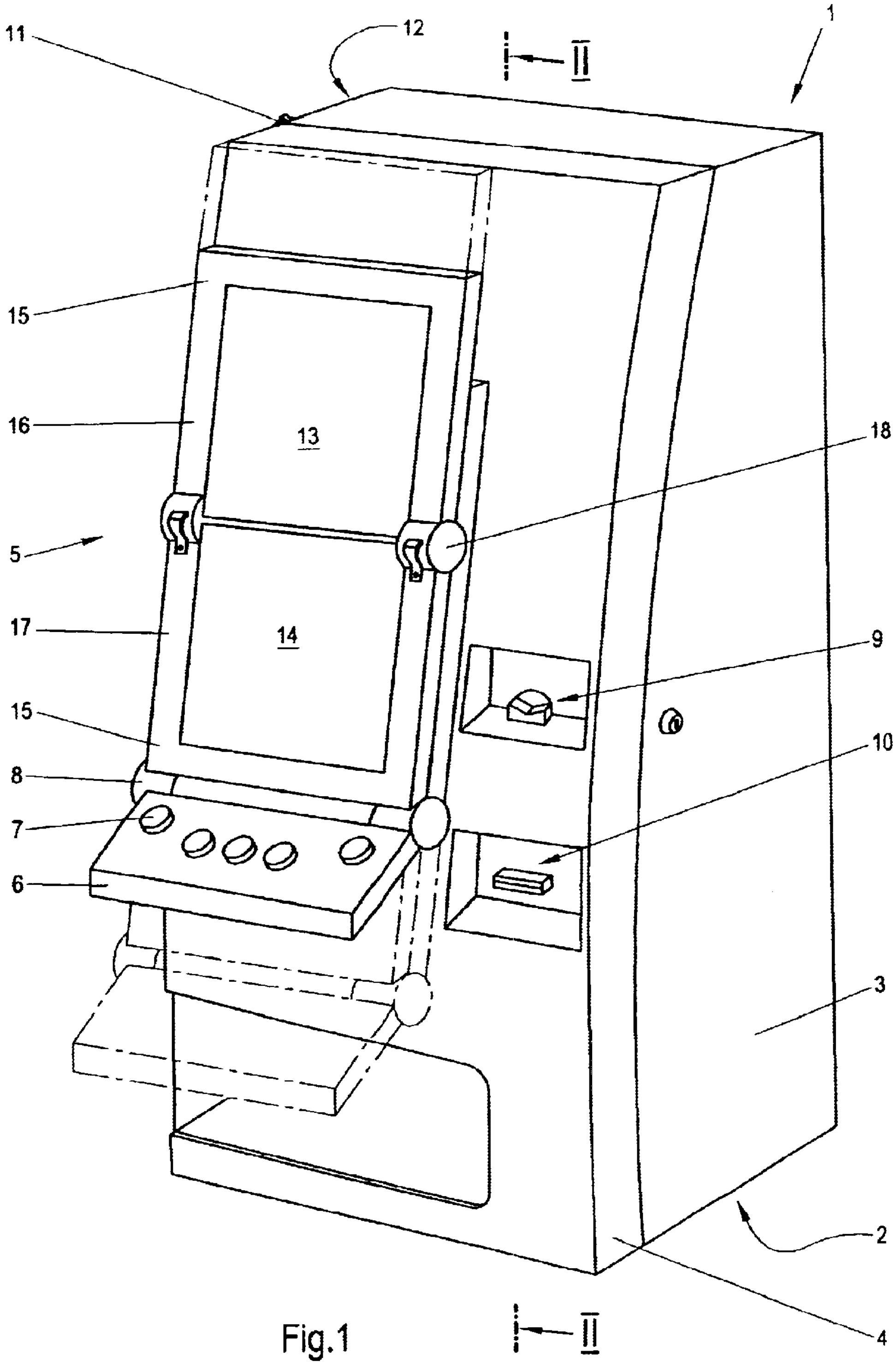
FIG. 1 shows a front elevational perspective view of a coin operated entertainment automat with a symbol display device disposed slidable with respect to height level.

A coin actuated entertainment automat designated with reference numeral 1 in FIG. 1 comprises a casing 2, wherein the casing 2 comprises a base body 3 and a door element 4 and a slidable symbol display device 5 is supported on the door element 4, wherein an operating keyboard 6 with operating keys and push-button elements 7 is coordinated to the symbol display device 5. The operating keyboard 6 is tiltable around a horizontally running rotary axis 8 disposed below the symbol display device 5. Devices 9, 10 for receiving coins and bank notes are furnished neighboring to the symbol display device 5. A door element 4 is tiltable around the vertically running hinge axis by way of a hinge element 11 running vertically and disposed at a side wall 12 of the base body 3 in the region of the door element 4. The symbol display device 5 comprises two flat picture screens 13, 14, wherein the two flat picture screens 13, 14 are disposed on top of each other and are received by a frame part 15 disposed on the side of the door element 4. The frame part 15 exhibits an upper and a lower part frame 16, 17, wherein in each case one flat picture screen 13, 14 is disposed in a respective part frame 16, 17. The two part frame regions 16, 17 are connected to each other by way of hinges 18 disposed at the side of the respective part frame 16, 17.

Figure 2:
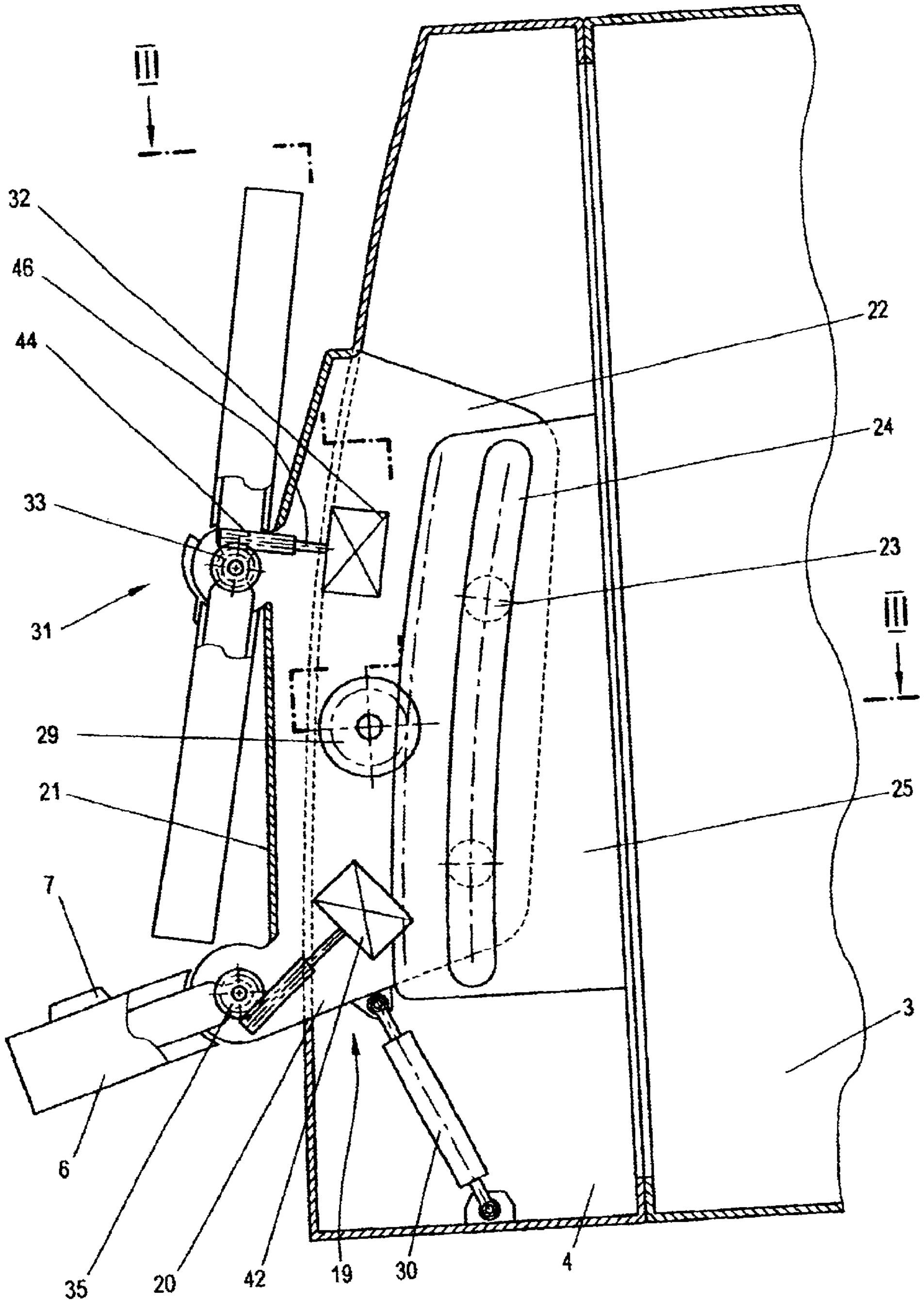
FIG. 2 shows a side elevational and in part sectional view of the coin operated entertainment automat for vertical adjustment of the position of the symbol display device, according to FIG. 1, along section line II—II of FIG. 1.
Figure 3:
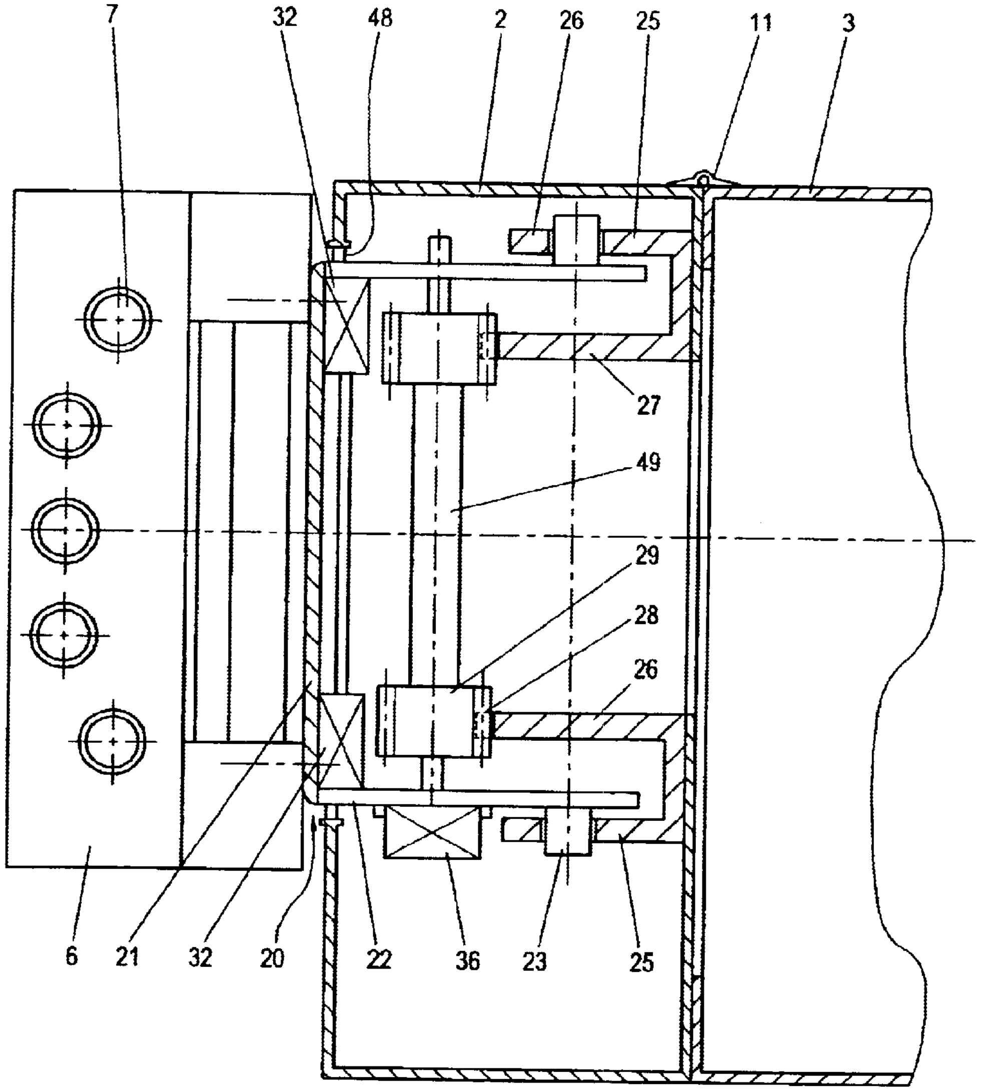
FIG. 3 shows a top planar and in part sectional view of the embodiment according to FIG. 1 for adjusting the symbol display device according to section line III—III of FIG. 2.

The device according to the present invention for vertical sliding of the symbol display device 5 is shown in a middle sectional view in FIG. 2 along to the section line II—II of FIG. 1. A device 19 for vertical moving of the symbol display device 5 is disposed in the door element 4 closing the base body 3. The device 19 comprises a U-shaped formed support device 20. The symbol display device 5 is tiltably disposed at a web or bracket 21 of the support device 20. The free arms 22 of the support device 20 penetrate two vertically and parallel running breakouts 48 of the door element 4. Guide tenons 23 are attached to the arms 22 in the free end region of the arms 22, wherein the guide tenons 23 cooperate with elongated hole shaped breakouts 24 of a U-shaped formed drive frame 25. Vertically running and elongated hole shaped breakouts 24 receiving the guide tenons 23 are disposed in the drive frame 25. The free ends of the arms 22 of the support device 20 are surrounded by the arms 26, 27 of the U-shaped formed drive frame 25 (FIG. 3). Overall the arms 26, 27 seen in a cross-section in FIG. 3 exhibit more the shape of a bracket, wherein the respective brackets extend vertically with their longest side. The arms 26, 27 of the drive frame 25 are disposed parallel to each other and the arm longitudinal direction according to FIG. 3 is horizontal and the arms 26, 27 exhibit a toothing 28 on one side of the free end of the arms 26, 27. A toothed gear wheel shaft 29 engages in the gear toothing 28 of the drive frame 25, wherein the toothed gear wheel 29 is disposed in the free arms 22 of the support device 20. An arrangement 30 for balancing the weight force of the support device 20 and of the symbol display device 5 engages at the arm 22 of the support device 20. The arrangement 30 can be a shock absorbing device and a weight balancing device. The part frames 16, 17 are disposed tiltable around the horizontally running rotation axis 18 located at the support device 20. Preferably, the part frames 16 and 17 are separately tiltable and a tilting device 31 is coordinated to each of the part frames 16, 17. The tilting device 31 disposed in the side region of the frame part 15 comprises a set drive or actuator 32, wherein the actuator 32 cooperates with gear wheels 33 attached at part frames 16, 17 disposed at the frame and not illustrated in detail. The upper part frame 16 and the lower part frame 17 are connected with a hinge 18. The hinge 18 comprises an axis, wherein the axis runs between the upper part-frame 16 and the lower part frame 18. A toothed gear wheel 33 is rotatably disposed on the axis in each case near an end of the axis. A first gear wheel 33 is connected fixed against relative rotation to the upper part frame 16 and a second gear wheel 33 is connected fixed against relative rotation to the lower part frame 16. A set drive 32 is coordinated to each part frame. The set drive includes a drive shaft, a worm wheel disposed on the drive shaft, wherein the worm wheel 44 engages the corresponding toothed gear wheel 33. The corresponding part frame 16, 17 is tilted around the axis upon actuation of the drive motor of the set drive 32.

The actuator 32 is furnished with a shaft 46 and a worm wheel 44, wherein the worm wheel 44 engages the respective gear wheel 33. The symbol display device 5 comprising the part frames 16 and 17 is disposed at the web or bracket 21 of the support device 20 and is connected to the swivelling device 31 and each part frame 16, 17 can be swivelled within a predetermined angle region including a vertical position of the part frame 16 and/or the part frame 17. The frame part 15 formed out of the two part frame regions 16, 17 is attached at the support device 20, wherein the part frames 16, 17 can be swivelled around a common horizontally running rotation axis 18 including and/or near a vertical position. The swivelling device 31 is disposed in the area of adjoining part frame 16, 17 of the symbol display device 5. An actuator 32 is coordinated to each part frame 16, 17 of the symbol display device 5. This actuator 32 can be controlled by activating of a coordinated operating element on the operating keyboard 6 and can be moved by a actuator 32 into the desired position. The operating keyboard 6 with the operating elements 7 is disposed at a web or bracket 21 of the support device 20 below the symbol display device 5. The operating disk 6 can be swivelled around a horizontally disposed attachment axis 35 by a motor 42 relative to the support device 20.

The device according to the present invention is illustrated in FIG. 3 along section line III—III of FIG. 2. The door element 4 is tiltably disposed at the base body 3 by mediation of a vertically running hinge strip 11. The device according to the present invention is disposed in the door element 4. The drive frames 25 are disposed in the box-like formed door element 4. The support device 20 according to the present invention is formed of a U-shape. The free arms 22 of the support device 20 penetrate vertically running slot shaped breakouts 48 in the door element 4. Guide tenons 23 are disposed at the end side of the free arms 22 and correspond to and are guided by elongated holes disposed in the drive frame 25. The U-shaped formed drive frames 25 are attached to the inner side of the door element 4. The parallel running arms 26, 27 of the two U-shaped drive frames 25 are disposed toward each other in the orientation of the drive frames 25 and exhibit a gear toothing 28 on their respective front face. A gear wheel 29 located on a shaft 49 supported by the support device 20 engages in the gear toothing 28. A drive motor 36 attached to one of the free arms 22 engages at a free end of the shaft 49. A symbol display device 54 or, respectively, the display means are tiltably disposed on the web or bracket 21 of the support device 20. In the same way an operating keyboard 6 with operating elements 7 is tiltably disposed relative to a horizontal axis at the web or bracket 21 of the support device 20.

The set drives or actuators 32, the drive motor 36, and the motor 42 can be provided by electrical drive motors. Alternatively, some or all of the set drives or actuators 32, the drive motor 36, and the motor 42 can be furnished by a manually operated drive and/or transmission element.

It will be understood that each of the elements described above, or two or more together, may also find a useful application in other types of automatic gaming system configurations and gaming display procedures differing from the types described above.

While the invention has been illustrated and described as embodied in the context of an apparatus for positioning a symbol display device onto a door element of a casing of a coin operated entertainment automat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An apparatus for positioning of a symbol display device on a door element of a casing of a coin actuated entertainment automat comprising a frame of the coin actuated entertainment apparatus;

a door element attached to the frame;

a symbol display device disposed only slidable vertically relative to the door element.

2. The apparatus according to claim 1 further comprising an actuator supported by the door element and engaging the symbol display device for sliding the symbol display device into a desired position.

3. The apparatus according to claim 1 further comprising a support device for the symbol display device and movably, in a substantially vertical direction, supported on the door element;

tilting means attached to the support device and supporting the symbol display device such that the symbol display device is disposed tiltable including a vertical position of the symbol display device.

4. The apparatus according to claim 1 further comprising a first substantially flat picture screen disposed at the symbol display device, wherein the first substantially flat picture screen is formed as a TFT-video display or a liquid crystal display LCD video display;

a second substantially flat picture screen disposed at the symbol display device, wherein the second substantially flat picture screen is formed as a TFT-video display or a liquid crystal display LCD video display.

5. The apparatus according to claim 1 further comprising a drive frame is attached in the door element;

a support device for the symbol display device and movably, in a substantially vertical direction, supported on the drive frame, wherein the symbol display device is attached at the support device.

6. The apparatus according to claim 1 further comprising a support device for the symbol display device and movably, in a substantially vertical direction, supported on the door element;

an operating keyboard disposed swivelable around a horizontally running axis on the support device;

an actuator mounted on the support device, wherein the actuator can furnish a change of a set angle of the operating keyboard relative to a substantially horizontal position of the operating keyboard.

7. The apparatus according to claim 6, wherein the actuator is a drive motor or a hand operated actuator.

8. The apparatus according to claim 1 further comprising a drive frame attached to the door element and disposed inside of the door element, wherein the drive frame is formed by a first channel bracket having a first inner bracket and having a first outer bracket, and by a second channel bracket having a second inner bracket and having a second outer bracket, wherein the first channel bracket is disposed substantially vertically extending and wherein the first channel bracket is disposed substantially vertically extending, wherein the first outer bracket is furnished with a first slot extending in a substantially vertical direction, wherein the second outer bracket is furnished with a second slot extending in a substantially vertical direction, wherein the first inner bracket is furnished at an end surface with a first gear toothing, wherein the second inner bracket is furnished at an end surface with a first gear toothing.

9. The apparatus according to claim 1 further comprising a support device for the symbol display device and movably, in a substantially vertical direction, supported on the door element;

a first free arm attached to the support device;

a second free arm attached to the support device;

a first guide tenon attached to the first free arm for engaging a first slot;

a second guide tenon attached to the first free arm for engaging a second slot;

a horizontal shaft mounted between the first free arm and the second free arm;

a first gear wheel mounted to the shaft for engaging a first gear toothing;

a second gear wheel mounted to the shaft for engaging a first gear toothing;

a drive motor attached to the first free arm and connected to the shaft for driving the shaft.

10. The apparatus according to claim 1 further comprising a support device for the symbol display device and movably, in a substantially vertical direction, supported on the door element;

a first part frame hinged along a horizontal axis to the support frame;

a first gear wheel attached to the first part frame and rotatably supported on the support device;

a first actuator supported on the support device for engaging the first gear wheel.

11. The apparatus according to claim 10 further comprising a second part frame hinged along a horizontal axis to the support frame;

a second gear wheel attached to the second part frame and rotatably supported on the support device;

a second actuator supported on the support device for engaging the second gear wheel, wherein the horizontal axis is disposed substantially between the first part frame and the second part frame.

12. The apparatus according to claim 1 further comprising a support device for the symbol display device and movably, in a substantially vertical direction, supported on the door element;

an operating keyboard hingedly attached to the support device;

operating keys attached to the operating keyboard;

a keyboard gear wheel attached to the operating keyboard and rotatably supported on the support device;

a keyboard actuator supported on the support device for engaging the keyboard gear wheel.

13. The apparatus according to claim 1 further comprising a support device for the symbol display device and movably, in a substantially vertical direction, supported on the door element;

a first free arm attached to the support device;

a second free arm attached to the support device;

a recess in the door element for allowing the support element with the first free arm and with the second free arm to move relative to the housing;

an arrangement for balancing a weight force of the support device and attached to the support device and attached to the door element.

14. The apparatus according to claim 1, wherein the symbol display device is slidable along a single line.

15. The apparatus according to claim 1, wherein the symbol display device is slidable along a single curve.

16. The apparatus according to claim 1, wherein the symbol display device is swivelable around a horizontal axis.

17. An apparatus for positioning of a symbol display device on a door element of a casing of a coin actuated entertainment automat wherein the symbol display device (5) is disposed slidable in a vertical direction along a guide line on the door element (4) of the casing of the entertainment automat (1).

18. The apparatus according to claim 17, wherein the symbol display device (5) is slidable with an actuator (36) actuated by an auxiliary force.

19. The apparatus according to claim 17, wherein the symbol display device (5) is disposed tiltable from a vertical position and attached at a support device (20) movable in a vertical direction.

20. The apparatus according to claim 17, wherein the symbol display device (5) comprises two or more flat picture screens (13), (14) formed as a TFT-video display or a liquid crystal display LCD video display.

21. The apparatus according to claim 17, wherein the symbol display device (5) is attached at a door side support device (20), wherein the door side support device (20) corresponds to a drive frame (25), wherein the drive frame (25) is attached in the door element (4).

22. The apparatus according to claim 17, wherein the operating desk (6) is disposed swivelable around a horizontally running axis of the support device (20) and wherein the set angle of the operating desk (6) is changeable with an actuator (32).

23. The apparatus according to claim 22, wherein the actuator means is a drive motor (36) or a hand operated actuator (32).

24. An apparatus for positioning of a symbol display device on a door element of a casing of a coin actuated entertainment automat comprising a frame of the coinoperated entertainment apparatus;

a door element attached to the frame;

a first picture screen disposed slidable in a substantially vertical direction relative to the door element a second picture screen disposed slidable in a substantially vertical direction relative to the door element.

25. The apparatus according to claim 24, wherein the first picture screen is swivelable around a horizontal axis; and wherein the second picture screen is swivelable around the horizontal axis.

26. An apparatus for positioning of a symbol display device on a door element of a casing of a coin actuated entertainment automat comprising a frame of the coin actuated entertainment apparatus;

a door element attached to the frame;

a symbol display device disposed slidable in a substantially vertical direction relative to the door element a keyboard disposed slidable in a substantially vertical direction relative to the door element.

27. An apparatus for positioning of a symbol display device on a door element of a casing of a coin actuated entertainment automat comprising a frame of the coin actuated entertainment apparatus;

a door element attached to the frame;

a symbol display device disposed slidable in a single direction relative to the door element.

28. An apparatus for positioning of a symbol display device on a door element of a casing of a coin actuated entertainment automat comprising a frame of the coin actuated entertainment apparatus;

a door element attached to the frame;

a symbol display device mounted to the door element and slidable in a substantially vertical direction relative to the door element.

29. The apparatus according to claim 28 further comprising a U-shaped support device for the symbol display device and movably, in a substantially vertical direction, supported on the door element;

tilting means attached to the support device and supporting the symbol display device such that the symbol display device is disposed tiltable including a vertical position of the symbol display device.

* * * * *